United States Patent [19]

Kircher

[11] Patent Number: 4,537,469
[45] Date of Patent: Aug. 27, 1985

[54] MULTI-FUNCTION COMPOSITE MATERIAL UTILIZING EMBEDDED OPTICAL FIBERS

[75] Inventor: Hartmann J. Kircher, Sparta, N.J.

[73] Assignee: Grumman Aerospace Corporation, Bethpage, N.Y.

[21] Appl. No.: 684,176

[22] Filed: Dec. 21, 1984

Related U.S. Application Data

[63] Continuation of Ser. No. 614,385, May 25, 1984, abandoned, which is a continuation of Ser. No. 337,977, Jan. 1, 1982, abandoned.

[51] Int. Cl.³ .............................................. G02B 5/16
[52] U.S. Cl. .............................. 350/96.24; 350/96.10; 356/44
[58] Field of Search ............... 350/96.10, 96.24, 96.25, 350/96.26, 96.27; 356/44, 43

[56] References Cited

U.S. PATENT DOCUMENTS

| | | | |
|---|---|---|---|
| 2,906,656 | 9/1959 | Case | 350/96.24 X |
| 2,931,739 | 4/1960 | Marzocchi et al. | 350/96.24 X |
| 3,723,722 | 3/1973 | Van Iderstine et al. | 350/96.10 |
| 4,176,910 | 12/1979 | Nöethe | 350/96.24 |

OTHER PUBLICATIONS

*Optical Fiber Communication Systems*; C. P. Sandbank; John Wiley & Sons; Aug. 28, 1980; p. 14.

*Primary Examiner*—John Lee
*Assistant Examiner*—Lester Rushin
*Attorney, Agent, or Firm*—Pollock, VandeSande & Priddy

[57] ABSTRACT

A composite material having high mechanical strength and optical transmission capabilities may be adapted for use in aircraft structural body elements, lighting displays, and other environments where light transmitting and receiving systems are located in physical proximity with a structural component. The disclosed material eliminates the need for separate retention structures for optical fibers.

6 Claims, 4 Drawing Figures

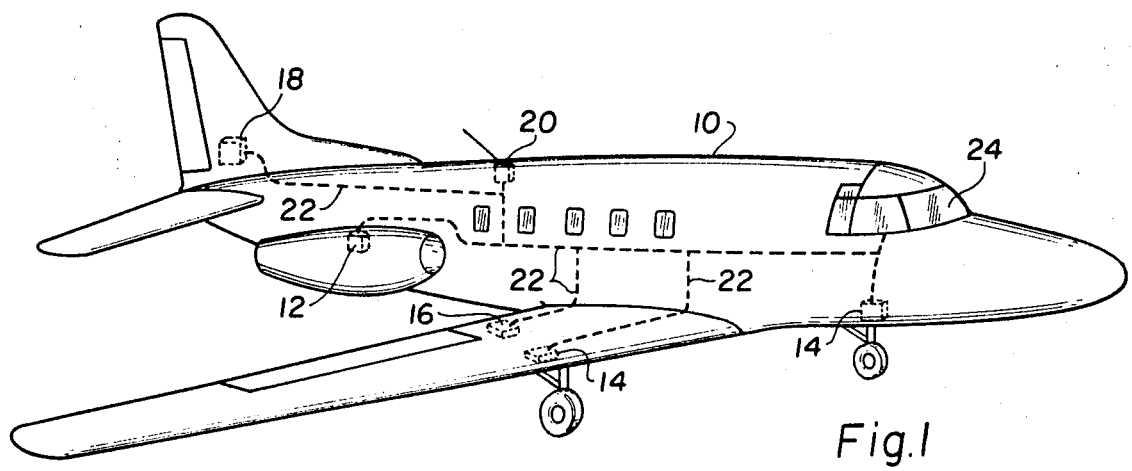
Fig.1
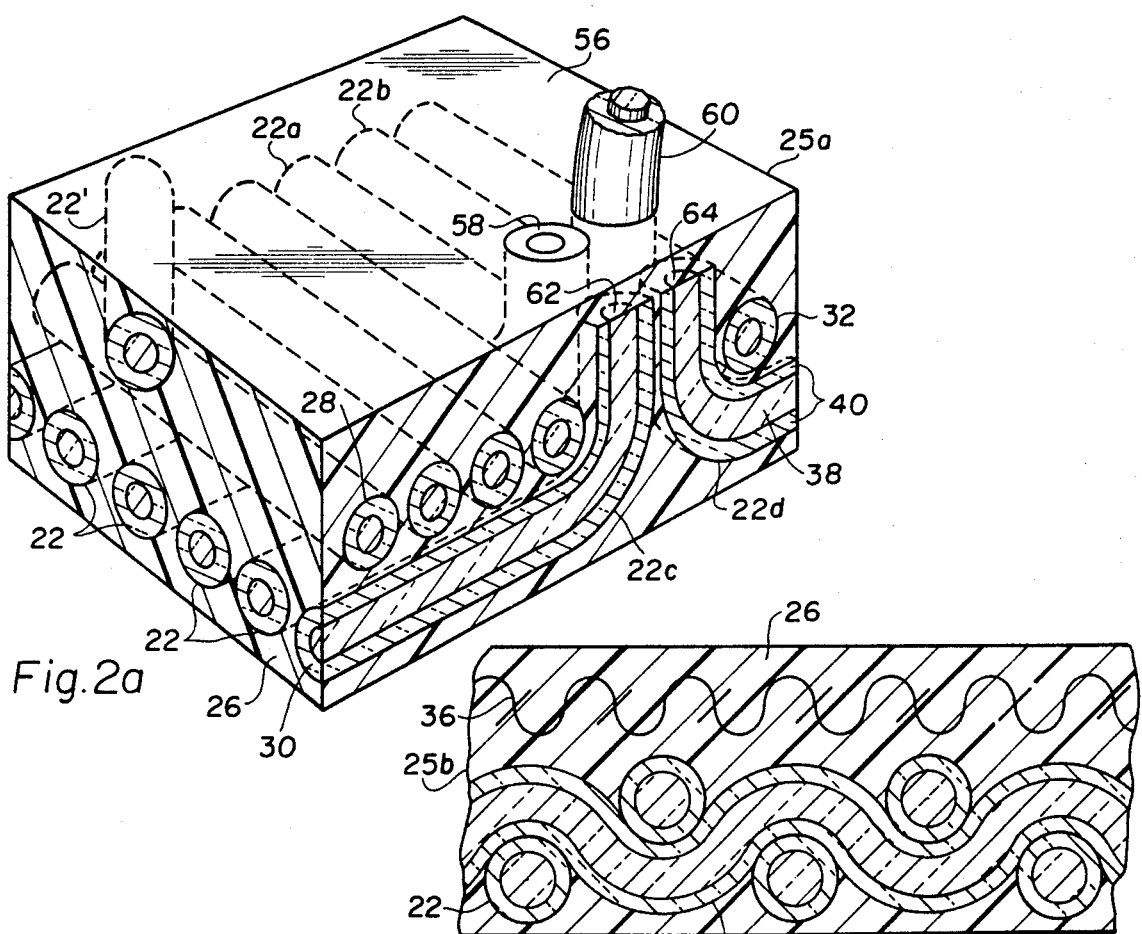
Fig.2a
Fig.2b
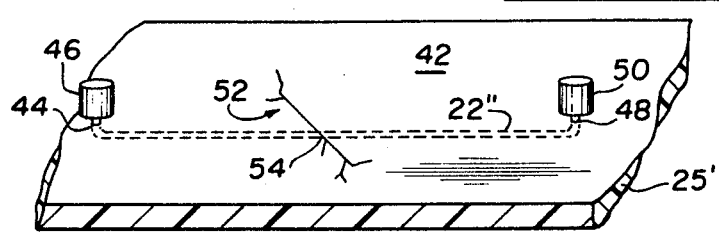
Fig.3

MULTI-FUNCTION COMPOSITE MATERIAL UTILIZING EMBEDDED OPTICAL FIBERS

This application is a continuation of application Ser. No. 614,385, filed May 25, 1984 (abandoned), which is a continuation of application Ser. No. 337,977, filed Jan. 1, 1982 (abandoned).

BACKGROUND OF THE INVENTION

The technologies of fiber optics and advanced composites have expanded to many applications in the aerospace industry. As dwindling energy supplies drive up the cost of aviation fuel, lightweight composites are replacing metal even in structural elements of aircraft. Similarly, fiber optic communication channels are increasingly replacing conventional electric wiring in aircraft and other structures. Among the various advantages of optical fibers over wires are the elimination of electromagnetic problems (i.e., noise pickup and incidental radiation of information desired to be kept secure); lowered raw material costs; elimination of potentially dangerous conductive paths and sparking problems in explosive environments: and weight savings.

Various examples of lightweight composite materials suitable for use in automotive and airplane bodies, boat hulls, furniture, building panels and other applications where high mechanical strength is essential may be found in U.S. Pat. Nos. 3,944,704, issued to Dirks: and 4,034,137 and 4,012,746, both issued to Hofer. Similarly, applications involving the embedding of optical fibers in a supporting matrix are shown in U.S. Pat. Nos. 3,728,521: 3,777,154: and 4,176,910, issued, respectively, to Borough, et al; Lindsey; and Noethe.

Both composites and optical fibers may be applied to structures employing light transmitting and receiving systems, such as aircraft, the composites being used to form structural components, and the optical fibers providing communication channels between the systems. Various difficulties have been encountered, however, in the installation and maintenance of optical fibers. Typically, the fibers are combined in bundles, sheathed, and held in place by appropriate retention structures which may be formed integrally with an associated structural component. Such a scheme is unsatisfactory for several reasons. While sheathing affords some protection, the enclosed fibers may still be broken if struck or compressed. Further, the required retention structure represents an added effort for molding the component. Various post molding steps, such as drilling and cutting apertures through which the fibers must pass, must be performed, resulting in increased manufacturing costs. Also, such apertures degrade the strength of the structure and introduce passages for leakage of gasses and liquids.

Thus it is seen that it would be of great advantage to eliminate the problems associated with segregated structural components and optical fibers.

SUMMARY OF THE INVENTION

It is a principle object of this invention to provide a multi-function composite material which incorporates both reliable mechanical properties and optical transmission capabilities.

One further object of the present invention is to provide means for detecting fractures in a composite structure.

Yet another object is to supply a composite material which may be used to form optical communication displays.

A still further object of the present invention is to provide a structural component which may be used to transmit light energy for device-to-device and network communication purposes.

These and other objects and advantages are realized in brief by providing a resin matrix forming a structural component in which are embedded a plurality of optical fibers. The fibers are arranged in a desired pattern to interconnect optical transmitting and receiving systems which may be supported or housed by the component. Another object of this invention is to use currently available high tensile strength optical fibers in a composite structure to provide reinforcement, i.e. the optical fibers may be layered into mats or interwoven to form a cloth, thus adding mechanical strength to the component.

BRIEF DESCRIPTION OF DRAWINGS

A better understanding of the present invention may be had with reference to the appended drawings, in which:

FIG. 1 is an isometric view of an aircraft embodying the present invention;

FIGS. 2a and b are cross sections of different embodiments of the composite material of the present inventions; and FIG. 3 shows an example of a particular application of the present invention.

DETAILED DESCRIPTION OF PREFERRED EMBODIMENTS

FIG. 1 shows an aircraft 10 which includes a number of control systems 12, 14, 16, 18 and 20 connected by optical fibers 22 to cockpit 24. The various control systems may include engine throttle control 12, landing gear controls 14, aileron control 16, rudder control 18, and antenna control 20. Other systems which are located at physically spaced locations within the aircraft may be similarly connected by optical fibers. In general, each control system must be adapted to transmit and/or receive optical control signals. Optical fibers 22 are imbedded within the various body sections of aircraft 10 in such a pattern as to provide a plurality of channels for reliable transmission of optical signals between control systems and signal generators.

FIGS. 2a and b show cross sections of composite materials 25a and 25b embodying the present invention. Both sections 25a and 25b include a resin matrix 26 in which are embedded optical/structural fibers 22, in keeping with the present inventive concept.

Sections 25a and b may, for example, represent portions of structural members of aircraft 10 (e.g., fuselage or wing sections, interior panels, etc.); or, more generally, any structural member which may be formed by present techniques to conform to a desired shape (e.g., boat hulls, motor vehicle bodies, advertising displays, etc.)

It will be appreciated that both the communication network and the mechanical requirements (stiffness, load bearing, etc.) of the structural member must be considered in choosing a pattern for optical fibers 22. In section 25a (FIG. 2a), an optical fiber reinforcing mat 28 comprises two layers, 30 and 32 of parallel (i.e., side-by-side) fibers 22, yielding a plurality of optical channels along two generally perpendicular directions.

The same general communication network may be achieved as shown in FIG. 2b by using an interwoven cloth 34 of optical fibers 22, yielding greater mechanical strength. Structural member 25b also includes an additional reinforcing layer 36 which may be made from woven or matted graphite, boron, glass, acrylic or ceramic fibers or any other conventional reinforcing material.

It is anticipated that a network of 2 or more sets of parallel fibers may be insufficient in certain applications. In such cases, additional fibers such as 22' connecting desired points in an optical network may be added to either reinforcing structure 28 or 34 by imbedding same in the matrix 26 of composite 25a or 25b. Alternatively, some of the parallel fibers may have terminals throughout the structural member which may be interconnected by conventional optical fiber connecting devices. Such devices may also be used to interconnect the optical network of adjacent structural members.

Matrix 26 may be formed of any conventional moldable material, such as epoxy, polyester, etc., which, in combination with high strength optical fibers, meets the structural requirements of aircraft 10. While conventional composite binders normally comprise some form of thermosetting plastic, other materials, such as ceramic, plaster, concrete, etc., may be used depending on the particular application involved.

Optical fibers 22 may be made of material which possesses desired light transmission characteristics and structural properties.

To insure proper light transmission, optical fibers typically include a core material 38 having a relatively high optical density or index of refraction surrounded by a coating or cladding material 40 with a relatively lower optical density than the core. The construction of fibers 22 may be varied to satisfy desired structural and optical characteristics. Preferably, high tensile strength fibers are used to insure reliable mechanical qualities.

With specific reference to optical characteristics, conventional fibers may be classified into three groups.

Step type optical fibers include a core of uniform optical density and are characterized by a step function change between the core and the lower optical density cladding material. Optical fibers in this group are typically utilized when attenuation is a major concern, and may be employed, for example, in the present invention to conduct light for purposes of illumination. One particular species of step type fibers is characterized by a small diameter core, on the order of six microns, surrounded by a cladding material having a diameter on the order of 20 times that of the core. Such fibers, known as single mode fibers, are commonly used in high bandwidth applications.

For high information rate applications, such as serial transmission of complex, digitally encoded flight control signals, graded core optical fibers are frequently used. Fibers of this type comprise a core material having an optical density which is highest at the center, and decreases with distance from the center to the interface of the core and cladding, where the optical densities of the core and cladding are substantially equal.

A third general class of optical fibers employs no explicit cladding material, but rather depends on the relatively lower index of refraction of the surrounding medium. Often the surrounding medium is air, which has for most purposes a lower optical density than any medium except a vacuum. For adaptation to the present invention, a matrix material must be selected for optical compatability (i.e., with a lower index of refraction than that of the unclad fibers) as well as mechanical requirements. Using the matrix as a cladding material may detract from the efficiency of light transmission or lead to "cross talk" among adjacent fibers, however, inefficiency may be overcome by the u.se of redundant fibers, while crosstalk may be used to advantage where it is desired to transmit the same optical signal over more than one fiber. Furthermore, uncoated fibers are generally less expensive, and by incorporating extra optical fibers, new light receiving and transmitting devices can be added without changing the original optical network.

FIG. 3 shows a particular application of the present invention, wherein one or more optical fibers 22" imbedded in a composite panel 25' are used to detect cracks caused by fires or other abnormal circumstances or stress fractures which may develop over time. Composite panel, 25' may, for example, be an aircraft structure having an area 42 which is subjected to stress due to aerodynamic forces encountered during flight. Optical fiber 22" passes through area 42, and has one terminal 44 coupled to an input lamp 46 and another terminal 48 coupled to a light detector 50. Thus, any fracture in area 42, as at 52, causing a break 54 in optical fiber 22" will result in attenuation of the light transmitted by the fiber, and will thereby be sensed by detector 48.

Referring again to FIG. 2a, various types of fiber optic terminals adaptable to the present invention are shown. Section 25a includes a surface 56 where optical signals are to be transmitted to or received from remote devices or light sources.

For transmission of light into section 25a, a light source or other optical signal generating device (such as devices 12, 14, etc., in FIG. 1) may be located directly adjacent to a fiber terminal on surface 56, such as terminal 58 of optical fiber 22a. Alternatively, optical signals may be transmitted to a fiber such as 22b having a section 60 extending beyond surface 56 and coupled to the optical signal generator via known fiber optic coupling devices.

For receiving optical signals from section 25a, terminals similar to those of fibers 22a and b may be used, or the terminals may be just below the surface 56, such as terminals 62 and 64 of fibers 22c and d. This latter arrangement may be used in conjunction with a matrix 26 of transparent or translucent material, particularly when the signals are to be viewed by the naked eye rather than by a receiver device, or when it is desired to prevent damage to the fiber optic terminals. If signal attenuation is not critical, light may also be transmitted into buried terminals such as terminals 62 and 64. Terminals 62 and 64 might be located, for example, in an area in which fires might break out, to provide fire detection means to a remote monitoring station. With regard to visual signals, the light emitted by the optical fibers may be modified by any conventional lenses or readout displays, such as, for instance, that shown in U.S. Pat. No. 3,516,724, issued to Ashton.

By appropriate arrangement of terminals in a structural display panel located, for instance, in an area of aircraft 10 visible to a passenger or crew member, various optical signals may be viewed without the necessity of providing an indicator panel having moving parts or light bulbs. In an aircraft environment, such signals might indicate altitude, bearing, wind speed, directions to passengers to fasten seat belts, etc. In a composite panel used for an advertising display, decorative arrangements of terminals might be utilized. Optical signals indicating temperatures in various parts of a building may be displayed on, as well as transmitted through, the walls of the building itself in accordance with the present invention.

While the foregoing descriptions have centered on discrete optical fibers following desired single fiber paths, layered into reinforcing mats or interwoven to form reinforcing cloths, the present invention is not limited to such structures. Both optical capabilities and structural characteristics may be enhanced by using ribbons or bundles of fibers in place of single, discrete fibers. Ribbons may comprise parallel strands for scanning devices, such as is disclosed in U.S. Pat. No. 3,272,063, issued to Singer, or interlaced strands to add structural integrity to the composite. Similarly, fiber bundles may be of the imaging type shown in U.S. Pat. Nos. 3,188,188 or 3,505,046, issued, respectively, to Norton and Phaneuf. Alternatively, interwoven bundles may be employed for structural purposes or to provide large cross section optical paths for illumination energy to be conducted from remote light sources to areas where illumination is desired for enchancing vision.

Various other modifications and applications of the present invention will be apparent to those of skill in the art. Accordingly, the foregoing descriptions are to be taken as examples only, the scope of the invention being defined in the claims which follow.

What is claimed is:

1. A reinforced structural member for detecting fires occurring in the vicinity of the member and comprising:
    a binder material conforming to a desired shape of the structural member;
    a plurality of high tensile strength optical fibers imbedded in the binder material and rigidly adhering thereto to reinforce the structural member;
    the fibers including first ends optically exposing the fibers to a flame occurring in the vicinity of the ends; and
    optical signal receiving means located at opposite ends of the fibers for detecting the occurrence of light travelling along the length of the fibers, produced by a flame.

2. A system integrated into a structural member for detecting occurrence of a fracture in the member, the system comprising:
    a plurality of high tensile strength optical fibers imbedded in and rigidly adhering to a hard binder material of the structural member;
    a light source arranged to illuminate first ends of the fibers therealong; and
    means located at opposite ends of the optical fibers for detecting cessation of light transmission caused by
    a sufficient fracture in the member, in the vicinity of the rigidly adhering fibers which in turn causes rupture of the fibers.

3. The structural member of claim 1 or 2 in which the optical fibers are arranged into at least two layers of parallel optical fibers, said layers forming a mat with optical channels in at least two directions.

4. The structural member of claim 1 or 2 in which the optical fibers are interwoven to form a reinforcing cloth.

5. A method for detecting fire comprising the steps:
    imbedding a plurality of high tensile strength optical fibers in a rigidly adhering binder material conforming to a particular shape thereby forming a reinforced structural member,
    first ends of the fibers being optically exposed to a flame occurring in the vicinity of the ends; and
    positioning opposite ends of the fibers at receiving means for enabling the receiving means to detect the presence of a flame near the first ends.

6. A method for detecting fracture in a structural member comprising the steps:
    imbedding a plurality of high tensile strength optical fibers in rigid adherence to the material of a structural member;
    locating a light source to illuminate first ends of the optical fibers such that light from the source travels therealong;
    locating a light detector at opposite ends of the optical fibers;
    whereby sufficient fracture in the material of the member, at the location of the fibers, causes rupture of the rigidly adhering fibers and a commensurate change in the level of detected light at the opposite ends.

* * * * *